United States Patent
Bai et al.

(10) Patent No.: US 10,940,845 B2
(45) Date of Patent: Mar. 9, 2021

(54) HYBRID BRAKE-BY-WIRE SYSTEM USING A MOTOR-MAGNETOSTRICTIVE ACTUATOR COMBINATION

(71) Applicant: Hefei University of Technology, Anhui (CN)

(72) Inventors: Xianxu Bai, Anhui (CN); Yang Li, Anhui (CN); Feilong Cai, Anhui (CN); Zhiyuan Si, Anhui (CN); Lijun Qian, Anhui (CN)

(73) Assignee: HEFEI UNIVERSITY OF TECHNOLOGY, Anhui (CN)

( * ) Notice: Subject to any disclaimer, the term of this patent is extended or adjusted under 35 U.S.C. 154(b) by 60 days.

(21) Appl. No.: 16/085,255

(22) PCT Filed: Jul. 20, 2017

(86) PCT No.: PCT/CN2017/093715
§ 371 (c)(1),
(2) Date: Sep. 14, 2018

(87) PCT Pub. No.: WO2018/120786
PCT Pub. Date: Jul. 5, 2018

(65) Prior Publication Data
US 2019/0084543 A1    Mar. 21, 2019

(30) Foreign Application Priority Data

Dec. 29, 2016 (CN) .......................... 201611241247.8

(51) Int. Cl.
*B60T 13/74* (2006.01)
*F16D 55/226* (2006.01)
(Continued)

(52) U.S. Cl.
CPC .......... *B60T 13/741* (2013.01); *B60T 13/667* (2013.01); *B60T 13/748* (2013.01);
(Continued)

(58) Field of Classification Search
CPC .. B60L 7/003; B60L 2200/26; F16D 2121/24; F16D 2121/28; F16D 2125/40
(Continued)

(56) References Cited

U.S. PATENT DOCUMENTS 5,267,479 A * 12/1993 Arvidsson ............... B60T 13/74
188/24.12
6,230,854 B1    5/2001 Schwarz et al.
(Continued)

FOREIGN PATENT DOCUMENTS

CN    1262804    8/2000
CN    101137524    3/2008
(Continued)

*Primary Examiner* — Robert A. Siconolfi
*Assistant Examiner* — San M Aung
(74) *Attorney, Agent, or Firm* — Stuart H. Mayer; Mayer & Williams PC

(57) ABSTRACT

The present invention discloses a motor-magnetostrictive actuator hybrid brake-by-wire system. The system includes a motor, a transmission mechanism, a magnetostrictive-driving piston mechanism and a floating-caliper disc mechanism. The transmission mechanism includes a planetary gear set and a screw set, and is driven by the motor. The linear motion of the sleeve is achieved by the planetary gear set and screw set. The sleeve pushes forward the piston head of the magnetostrictive-driving piston mechanism and the piston head pushes forward the brake pad back plate of the floating-caliper disc mechanism to clamp the brake disc, which accomplishes braking. The present invention uses the motor and the magnetostrictive-driving piston mechanism as a combined BBW system, which will simultaneously solve the problems of slow response, low precision and motor stalling effect of the only motor-driving braking systems and, also avoid the drawback of insufficient mechanical capabilities of the only magnetostrictive actuator-driving braking systems.

7 Claims, 6 Drawing Sheets

(51) Int. Cl.
*F16D 65/18* (2006.01)
*H02K 7/116* (2006.01)
*B60T 13/66* (2006.01)
*F16D 66/00* (2006.01)
*F16D 125/58* (2012.01)
*F16D 121/24* (2012.01)
*F16D 121/28* (2012.01)
*F16D 125/40* (2012.01)
*F16D 125/50* (2012.01)
*F16D 125/36* (2012.01)
*F16D 121/20* (2012.01)

(52) U.S. Cl.
CPC .......... *F16D 55/226* (2013.01); *F16D 65/18* (2013.01); *F16D 65/183* (2013.01); *H02K 7/116* (2013.01); *F16D 2066/003* (2013.01); *F16D 2066/005* (2013.01); *F16D 2121/20* (2013.01); *F16D 2121/24* (2013.01); *F16D 2121/28* (2013.01); *F16D 2125/36* (2013.01); *F16D 2125/40* (2013.01); *F16D 2125/50* (2013.01); *F16D 2125/587* (2013.01)

(58) Field of Classification Search
USPC ............................. 303/122; 188/196 V, 71.9
See application file for complete search history.

(56) References Cited

U.S. PATENT DOCUMENTS

| | | | |
|---|---|---|---|
| 6,367,597 B1* | 4/2002 | De Vries | B60T 13/74 188/196 V |
| 2005/0217952 A1* | 10/2005 | Usui | F16D 65/18 188/265 |
| 2010/0101901 A1* | 4/2010 | Gay | H01L 41/12 188/161 |
| 2013/0087417 A1* | 4/2013 | Yu | B60T 13/741 188/72.3 |
| 2016/0238097 A1* | 8/2016 | Chen | F16D 55/225 |

FOREIGN PATENT DOCUMENTS

| | | | | |
|---|---|---|---|---|
| CN | 101606004 | | 12/2009 | |
| CN | 102537140 | | 7/2012 | |
| CN | 106594115 | | 4/2017 | |
| DE | 19858764 A1 | * | 6/2000 | |
| JP | 61166759 A | * | 7/1986 | ............. F16D 65/18 |

* cited by examiner

HYBRID BRAKE-BY-WIRE SYSTEM USING A MOTOR-MAGNETOSTRICTIVE ACTUATOR COMBINATION

TECHNICAL FIELD

The present invention relates to a disc brake, and more particularly to a hybrid brake-by-wire system using a motor-magnetostrictive actuator combination.

BACKGROUND OF THE INVENTION

Automobiles, as one of the most important means of transportation vehicles, have developed, updated and innovated with dramatically fast development of science and technology. No matter how the automotive technology develops, vehicle's safety and energy saving have been always the core topics in the automotive industry and also the most concerned points of the customers. As one of the major automotive systems, the braking system plays a vital role in driving safety. At present, brake-by-wire system is rapidly developing as a new type of automobile braking system besides the traditional hydraulic, pneumatic and electromagnetic braking system. The new brake-by-wire system try to avoid the congenital defects of the traditional hydraulic, pneumatic and electromagnetic braking system such as the complexity of the system, high energy consumption and relatively low response speed (which means longer braking distance), but the brake-by-wire system itself is still in pre-researching and explore stage.

At present, specifically, a vast majority of automobiles are currently using conventional hydraulic disc brakes. Structurally, the hydraulic disc braking system comprises a brake pedal, a master cylinder, brake pipelines, wheel cylinders, a brake disc and brake pads. When driver send out the braking signal, braking pressure generated by the master cylinder is delivered by brake pipelines to generate corresponding pressure in each wheel cylinder to push the piston as well as the brake pads and clamp the brake disc to generate friction to achieve braking. Functionally, further, the auxiliary functions of anti-lock braking system (ABS), acceleration slip regulation (ASR) and electronic brake force distribution (EBD) can be realized by matching appropriate electronic control systems. However, there are inherent drawbacks of the conventional braking systems as follows:

(a) The long and sophisticated pipelines/valves of hydraulic and/or pneumatic braking systems lead to slow braking pressure transfer and then braking delay, which results in the increase of brake distance and unguaranteed vehicle braking safety.

(b) The complex pipelines and valves greatly increase complexity of the system and control, reduce reliability thereof, and thus the cost of braking system remains high.

(c) The pipelines, valves or electromagnetic actuators greatly increase the weight of the systems. Undoubtedly, the conventional hydraulic, pneumatic and electromagnetic braking systems are unbeneficial to achieve energy saving and emission reduction. (Data shows that the fuel consumption increases by 6%-8% while the mass of an automobile increases by 10%.)

(d) The hydraulic oil fulfilled in the hydraulic braking systems is flammable and may leak, which would possibly cause environment pollution and even threatens crash safety of automobiles.

The newly-proposed concept of BBW systems has potentially brought essential changes to the braking systems and the automotive industry. The new types of BBW systems are expected to solve the problems that the conventional brakes cannot avoid. However, it is presently at very start phase of investigation and industrial applications, and there are still some fatal problems of the existing BBW systems:

(a) Majority of the existing BBW systems are using motors as the only actuator. When braking, the motor and the related braking mechanism (often the ball-screw mechanism) are required to provide enough braking torque. However, the driving power of the motor is limited because of quite limited installation space. Then, a speed reduction mechanism, which is used to increase the driving force by decreasing speed, must be matched for the needed braking torque. But the excessive speed reduction ratio may equal to long response time of driving mechanism based on the motor and ball-screw set. Because the braking torque is generated by the output torque from the motor, and also the gap between the brake pads and the brake disc is clamped through pushing the piston.

(b) When the ABS works, the processes of reducing the torque (the counterpart of the "torque" herein in the BBW systems is the "pressure" in the conventional hydraulic braking systems), holding the torque and increasing the torque are completed in quite short time. The action from the motor to the piston is realized through the mechanical transmission mechanism. Thus, the accuracy of the states of reducing the torque, holding the torque and increasing the torque of ABS cannot be guaranteed. The braking distance increases and braking safety is threatened in turn.

(c) What is more important, for the BBW systems using motors as the only actuator, the motor may be stalling during long-time braking and could lead to motor burnout, which would directly lead to the failure of braking systems.

SUMMARY

The present invention is to solve the existing technical problems, providing a hybrid brake-by-wire system using a motor-magnetostrictive actuator combination to simplify the braking system and greatly reduce the system quality, and finally improve the system performances, especially the braking safety.

The present invention discloses a hybrid brake-by-wire system using a motor-magnetostrictive actuator combination. The system includes a motor, a transmission mechanism, a magnetostrictive-driving piston mechanism and a floating-caliper disc mechanism, wherein the transmission mechanism including a planetary gear set and a screw set is driven by the motor. The linear motion of the sleeve is achieved by the planetary gear set and screw set. The piston head of the magnetostrictive-driving piston mechanism pushed forward by both the sleeve and the magnetostrictive rod drives the brake pad back plate to clamp the brake disc through the right and left brake pads of the floating-caliper disc mechanism, which accomplishes braking.

The motor includes a stator and a rotor. The ring gear of the planetary gear set fixedly connected with the rotor is driven by the motor, and the screw of the screw set is coaxially assembled with the carrier and the sun gear of the planetary gear set. The screw and the carrier are connected via a connecting key. The nut and the screw are connected via threads, and the sleeve is which cases the nut fixedly connected with the nut at the rear end through bolts is driven to move linearly.

A pushrod is screwed into the piston head of the magnetostrictive-driving piston mechanism, and a gland is connected with the front end of the piston body by threads. The pushrod is installed onto the front end of a magnetostrictive rod by a bias spring, the piston body connected with the front end of the sleeve is driven to move linearly. The coil winding is wound on the bobbin installed outside of the magnetostrictive rod, which realizes controllable axial extension under the controlled electromagnetic field generated by the coil winding with applied current.

The left brake pad is fixed to the inner side of the left caliper arm of a caliper body, and the right brake pad is fixed to the left side of the brake pad back plate. The brake disc is sandwiched between the left brake pad and the right brake pad. The right side of the brake pad back plate is connected to the front end of the piston head in a "T" shape, and the brake pad back plate driven by the piston head pushes the right brake pad to squeeze the brake disc, forcing the caliper body to push the left brake pad towards the right to squeeze the brake disc, which realizes braking.

Further, a guide rail is penetrating the brake pad back plate in the caliper body from which the brake pad back plate (118) gets guided.

A prestress bolt is installed onto the rear end of the magnetostrictive rod for adjusting the initial position/stress of the magnetostrictive rod.

The braking control process are set as follows: when braking, the motor and the magnetostrictive-driving piston mechanism work coordinately to push the right and left brake pads to overcome the brake clearance and the corresponding resistance, and the brake disc is clamped by the right and left brake pads. When the braking torque reaches a preset value, the applied current to the motor is cut off and the screw set enters a self-locking state. No initial current is applied to the coil winding of the magnetostrictive-driving piston mechanism. At this point, if the wheel braking torque is insufficient, the coil winding is applied with an appropriate high-level current, ABS enters the stage of increasing the torque. If the wheel is in the optimal braking state, ABS enters the stage of holding the torque. If the wheel approaches to the locking state, the coil winding is applied with an appropriate low-level current, then ABS enters the stage of reducing the torque. At the end of braking, an appropriate reverse current is applied to the motor, simultaneously the applied current to the coil winding of the magnetostrictive-driving piston mechanism is cut off, and the magnetostrictive-driving piston mechanism resets.

A wedge-shaped caliper disc mechanism is used to replace the structure of the floating-caliper disc mechanism, and the wedge is connected with the front end of the magnetostrictive-driving piston mechanism. A roller is installed between the bevel of the floating wedge-shaped caliper disc mechanism and the bevel of the wedge.

A ball-screw set is used to replace the screw set, and a check structure consisting of a ratchet and a pawl is assembled on the ball-screw set.

A ball-screw set is used to replace the screw set, and a clutch is assembled between the ball-screw set and the planet carrier.

During the initialization of the braking process and/or the long-time braking process of ABS, if the magnetostrictive-driving piston/wedge mechanism fails to work, the main control system starts the backup controller. If fails again, the main control system cuts off the control signal to the magnetostrictive-driving module, meanwhile, starts the only motor-driving module, and simultaneously sends the warning signal to driver. The magnetostrictive-driving module for braking with ABS performance, motor-driving module for braking with ABS performance, and motor-driving regular braking with no ABS performance will be potentially functioning with descending priority with consideration of the fail-safe behavior.

Compared with the prior art:

1. Advantageously, the present invention can solve the safety problems caused by slow response of the conventional hydraulic or pneumatic braking systems, the drawbacks of relatively high power consumption caused by the increased vehicle mass due to the complex pipelines/valves and the potential safety issues caused by hydraulic oil leakage in the hydraulic braking systems. Moreover, the present invention also can avoid the defects of the insufficient braking torque of the electromagnetic braking systems and overweight mass, and greatly simplifies the braking systems and enhances braking safety.

2. Advantageously, the present invention uses the motor and the magnetostrictive-driving piston mechanism cascaded in series as a combined driving assembly for the new BBW system, which can simultaneously solve problems of slow response (i.e., poor braking system performance) of only motor-driving braking systems and the issues of limited strokes of the only magnetostrictive actuator-driving braking systems. At the same time, both the advantages of the motor-driving braking systems, including long stroke and large driving torque (force), and very fast response of the magnetostrictive actuator-driving braking systems, are kept for the present invention.

3. Advantageously, the present invention uses the motor and the magnetostrictive-driving piston mechanism cascaded in series as a combined driving assembly for the new BBW system, which can enhance the fail-safe performance of the magnetostrictive actuator-driving braking systems. The motor-driving mechanism will provide emergency braking capability when the magnetostrictive-driving piston mechanism fails. Braking safety can be guaranteed.

4. Advantageously, the present invention can effectively reduce the power of the motor using the self-reinforcing effect of wedge mechanism and in turn solve the issue of insufficient braking torque of only motor-driving braking system. The braking efficiency is improved.

5. Advantageously, the present invention uses a mechanical motion converter of screw set with self-locking property between the motor and the magnetostrictive-driving piston mechanism. For the motor-magnetostrictive actuator combination, when braking torque reaches the preset value, applied current of the motor could be cut off and the braking system is driven only by the magnetostrictive-driving piston mechanism, which can effectively eliminate motor stalling effect with no influences on ABS and other auxiliary functions of the braking system.

BRIEF DESCRIPTION OF THE DRAWINGS

The present disclosure will become more fully understood from the detailed description and the accompanying drawings, wherein.

Notation: the sequential numbers and the corresponding parts in the FIGs are listed.

101 motor, 102 stator, 103 rotor, 104 (301, 401) transmission mechanism, 105 planetary gear set, 106 ring gear, 107 planetary gear, 108 sun gear, 109 carrier, 110 screw set, 111 (306) screw, 112 nut, 113 (307) sleeve, 114 magnetostrictive-driving piston mechanism, 115 floating-caliper disc mechanism, 116 (203) caliper body, 117 guide rail, 118 brake pad back plate, 119 right brake pad, 120 brake disc, 121 left brake pad, 201 magnetostrictive-driving wedge mechanism, 202 wedge-shaped caliper disc mechanism, 204 roller, 205 wedge, 302 check structure, 303 pawl, 304 ratchet, 305 ball-screw set, 402 clutch, 10 piston head, 11 gland, 12 piston assembly, 13 coil winding, 14 bobbin, 15 outlet hole, 16 prestress bolt, 17 magnetostrictive rod, 18 pushrod, 19 bias spring, 20 wheel speed sensor, 21 by-wire brake, 22 electronic brake pedal, 23 angle sensor, 24 ABS indicator, 25 parking brake indicator, 26 ignition switch and 27 battery.

DETAILED DESCRIPTION OF EMBODIMENTS

Figure 1:
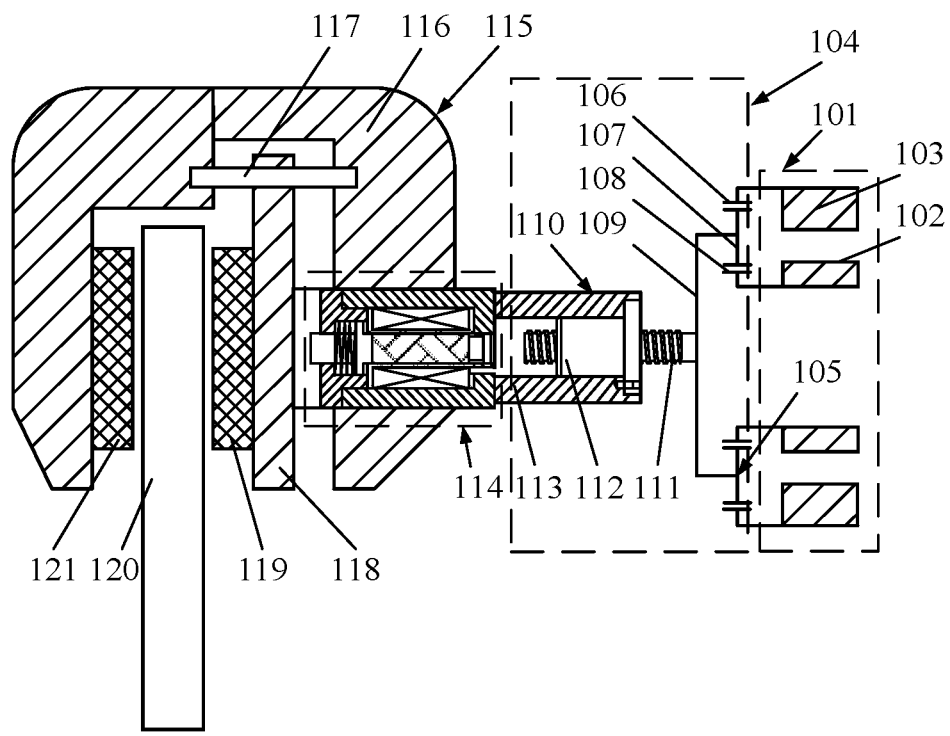
FIG. 1 shows a configuration of the present exemplary embodiment using a motor-magnetostrictive actuator combination.
Figure 2:
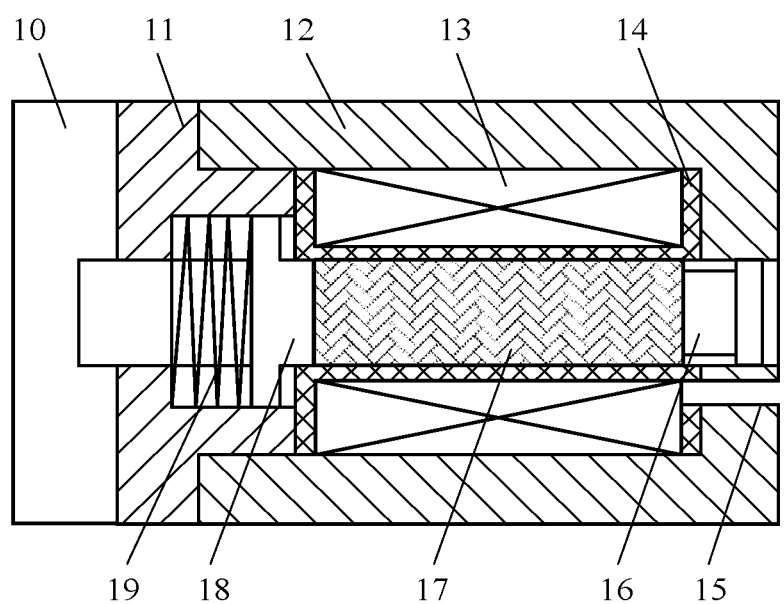
FIG. 2 shows an enlarged sectional illustration of the magnetostrictive-driving piston mechanism 114 of FIG. 1.

FIGS. 1 and 2 show a hybrid brake-by-wire system using a motor-magnetostrictive actuator combination, which in detail consists of a motor 101, transmission mechanism 104, magnetostrictive-driving piston mechanism 114 and floating-caliper disc mechanism 115 in the present embodiment.

FIG. 1 is a view showing that the motor 101 includes a stator 102 and a rotor 103, and the transmission mechanism 104 includes a planetary gear set 105 and a screw set 110. The planetary gear set 105 includes a ring gear 106, planet gears 107, a sun gear 108 and a carrier 109. The ring gear 106 is fixedly connected with the rotor 103 and driven by the motor 101, and the carrier 109 is coaxially assembled with the sun gear 108 and the screw 111. The screw 111 is assembled on the carrier 109 via a connecting key. The nut 112 and screw 111 are connected via threads. The rear end of the sleeve 113 is fixedly connected to the nut 112 through bolts and driven by the motor 101. The linear motion of the sleeve 113 is achieved by the transmission of the planetary gear set 105 and the screw set 110.

As shown in FIGS. 1 and 2, the piston head 10 of the magnetostrictive-driving piston mechanism 114 is connected to the output end of the pushrod 18 via threads. The gland 11 is screwed to the front end of the piston assembly 12, and the pushrod 18 is compressed onto the front end of the magnetostrictive rod 17 by a bias spring 19. For adjusting the initial position of the magnetostrictive rod 17, a prestress bolt 16 is attached to the rear end of the magnetostrictive rod 17. The rear end of the piston body 12 is connected to the front end of the sleeve 113, and the outlet hole 15 is provided for the coil lead. The linear motion of the piston assembly 12 is driven by the sleeve 113. The coil winding 13 is wound on the bobbin 14 installed outside of the magnetostrictive rod 17, which realizes controllable axial extension under the controlled electromagnetic field generated by the coil winding 13 with applied current.

Referring now to FIG. 1, the floating-caliper disc mechanism includes a left brake pad 121 fixed to the left caliper arm of the caliper body 116, a right brake pad 119 fixed to the brake pad back plate 118, using left brake pad 121 and right brake pad 119 to provide squeeze force on brake disk 120. The right side of the brake back plate 118 is connected to the front end of the piston head 10 in a "T" shape, and the brake pad back plate 118 driven by the piston head 10 pushes the right brake pad 119 to squeeze the brake disc 120, forcing the caliper body 116 to push the left brake pad 121 towards the right to squeeze the brake disc 120, which generates braking torque. In the caliper body 116, a guide rail 117 is penetrating the brake back plate 118 which could be guided through guide rail 117.

In the embodiment, the coarse adjustment of the braking process is realized by the control of the motor 101, meanwhile the fine adjustment of the braking process is realized by the control of magnetostrictive rod 17 through applied current regulation in the coil winding 13.

The motor 101 turns the screw 111 through the planetary gear set 105, pushing the sleeve 113 through the nut 112 to the left. When the braking torque reaches the preset value and the sleeve 113 in an expected position, the reverse locking function of the screw set 110 prevents the sleeve 113 from pushing the screw 111 reverse rotation. This reverse locking function can also be achieved by a check structure 302. The magnetostrictive-driving piston mechanism 114 is connected with the output end of the motor 101 through a transmission mechanism 104, pushing the brake pads against the brake disc 120 to achieve the purpose of deceleration.

The brake control modes are set that: when braking, the motor 101 and the magnetostrictive-driving piston mechanism 114 work coordinately, the motor 101 pushes the right and left brake pads 119, 121 to overcome the brake clearance and the corresponding resistance, and then the brake disc 120 is compressed by the right 119 and left 121 brake pads. When the braking torque reaches the preset value, the applied current of the motor 101 is cut off, and the screw set 110 enters self-locking state. No initial current is applied to the coil winding 13 of the magnetostrictive-driving piston mechanism 114. At this point, if the braking torque is insufficient, the coil winding 13 is applied with an appropriate high-level current, and ABS enters the stage of increasing the torque. If the wheel is in the optimal braking state, ABS enters the stage of holding the torque. If the wheel approaches to the locking state, the coil winding 13 is applied with an appropriate low-level current, then ABS enters the stage of reducing the torque. At the end of braking, reverse current is applied to the motor 101, simultaneously the applied current to the coil winding 13 of the magnetostrictive-driving piston mechanism 114 is cut off, and the magnetostrictive-driving piston mechanism 114 resets.

Figure 3:
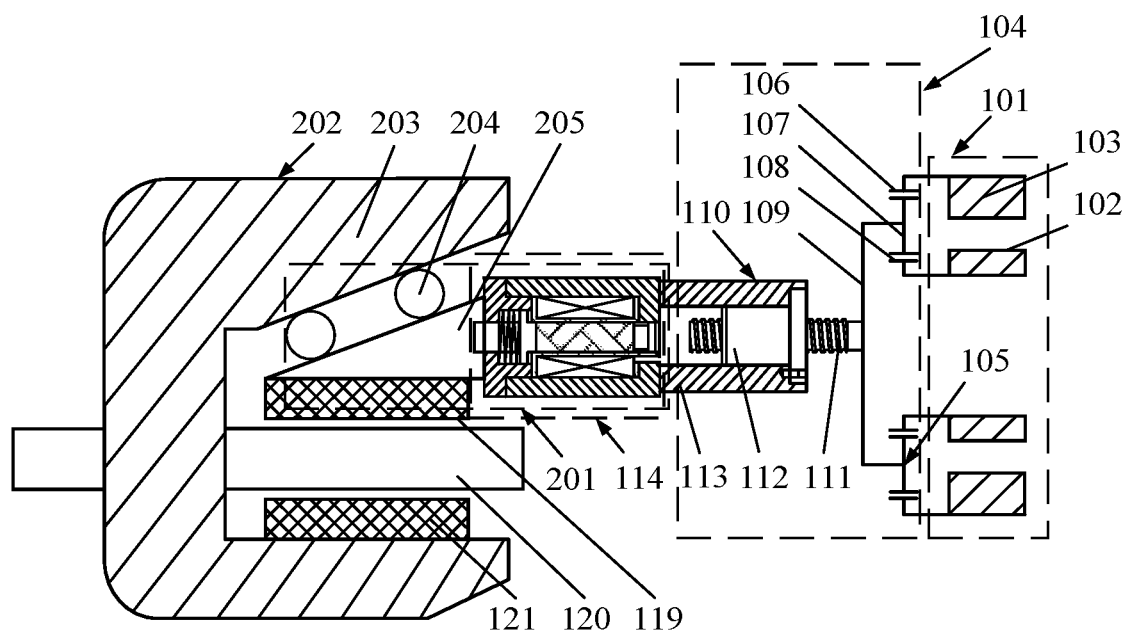
FIG. 3 shows a configuration of a second exemplary embodiment.

Referring now to FIG. 3, another embodiment of the present invention is shown. A wedge-shaped caliper mechanism 202 is used to replace the structure of the floating-caliper disc mechanism 115 as shown in FIG. 1. The wedge 205 is installed onto the front end of the magnetostrictive-driving piston mechanism 114. The self-reinforcing effect in braking process is realized through the interaction between two bevels of the wedge 205 and the wedge-shaped caliper mechanism 202. The required power of the motor for braking is much lower than the system with no wedge accordingly. When braking, the motor 101 and the wedge-shaped caliper disc mechanism 202 work coordinately. The motor 101 pushes the right and left brake pad 119, 121 to overcome the brake clearance and the corresponding resistance, then the brake disc 120 is compressed by the right 119 and left brake pad 121. When the braking torque reaches the preset value, the applied current to the motor 101 is cut off and the screw set 110 enters self-locking state. No initial current is applied to the coil winding 13 of the magnetostrictive-driving wedge mechanism 201. At this point, if the wheel brake torque is insufficient, the coil winding 13 is applied with an appropriate high-level current, and ABS enters the stage of increasing the torque. If the wheel is in the optimal braking state, ABS enters the stage of holding the torque. If the wheel approaches to the locking state, the coil winding 13 is applied with an appropriate low-level current, then ABS enters the stage of reducing the torque. At the end of braking, reverse current is applied to the motor 101, simultaneously the applied current to the coil winding 13 in the magnetostrictive-driving wedge mechanism 201 is cut off, and the magnetostrictive-driving wedge mechanism 201 resets.

Figure 4:
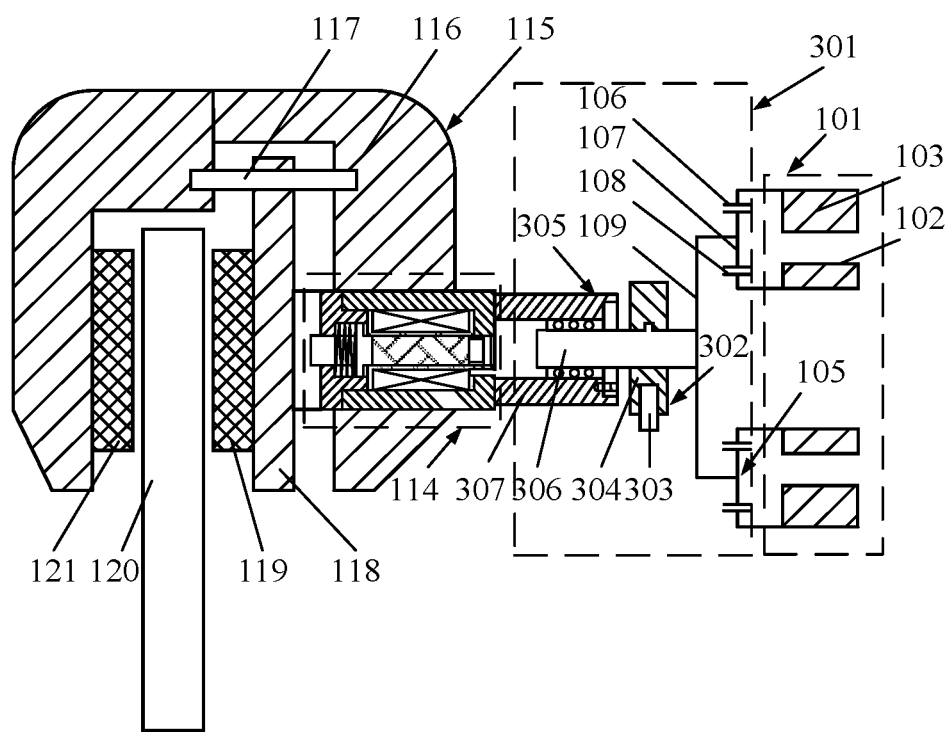
FIG. 4 shows a configuration of a third exemplary embodiment.

Referring now to FIG. 4, yet another embodiment of the present invention is shown. The ball-screw set 305 is used to replace the screw set 110 in the structure shown in FIG. 1. A check structure 302 composed of a ratchet wheel 304 and a pawl 303 is installed on the ball-screw 305. The ball-screw set has a higher transmission efficiency but doesn't has a self-locking function, so a locking device is further needed for the system. When braking, the motor 101 pushes the right and left brake pads 119, 121 to overcome the brake clearance and the corresponding resistance, then the brake disc 120 is clamped by the right 119 and left 121 brake pads. When the braking torque reaches the preset value, the applied current to the motor 101 is cut off, and the ratchet wheel 304 and the pawl 303 prevent the sleeve 113 to push the screw 306 reverse rotation under the retroaction of the braking torque. No initial current is applied to the coil winding 13 of the magnetostrictive-driving piston mechanism 114. At the mean time the system will estimate the wheel braking condition. If the wheel brake torque is insufficient, the coil winding 13 is applied with an appropriate high-level current, and ABS enters the stage of increasing the torque. If the wheel is in the optimal braking state, ABS enters the stage of holding the torque. If the wheel approaches to the locking state, the coil winding 13 is applied with an appropriate low-level current, then ABS enters the stage of reducing the torque. At the end of braking, releasing the pawl 303 firstly, then reverse current is applied to the motor 101, simultaneously the applied current to the coil winding 13 of the magnetostrictive-driving piston mechanism 114 is cut off, and the magnetostrictive-driving piston mechanism 114 resets.

Figure 5:
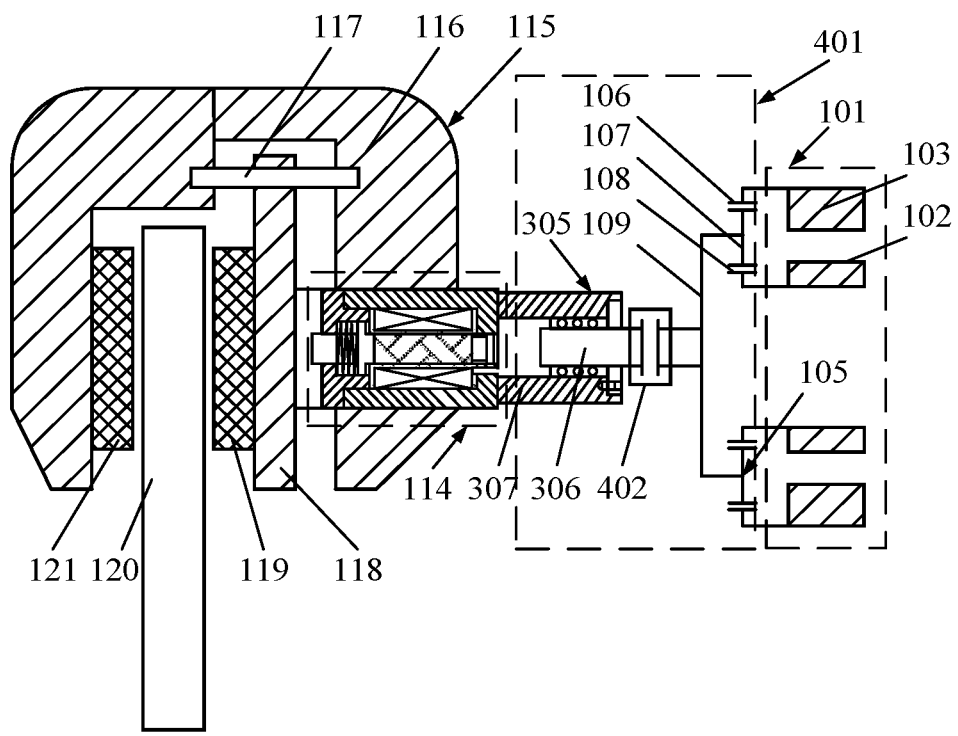
FIG. 5 shows a configuration of a fourth exemplary embodiment.

Referring now to FIG. 5, the check structure 302 composed of a ratchet wheel 304 and a pawl 305 as shown in FIG. 4 has another potential substitute of the clutch 402. In the case of piston holding motionless in long-time/distance braking, the motor will not stall due to the use of the clutch 402. When braking, the motor 101 pushes the right and left brake pads 119, 121 to overcome the brake clearance and the corresponding resistance, then the brake disc 120 is clamped by the right and left brake pads 119, 121. When the braking torque reaches the limit of the force that the clutch can deliver, the motor 101 remains rotating and the magnetostrictive-driving piston mechanism 114 plays the ABS role at this point. No initial current is applied to the coil winding 13 of the magnetostrictive-driving piston mechanism 114. At the mean time the system will estimate the wheel braking condition. If the wheel brake force is insufficient, the coil winding 13 is applied with an appropriate high-level current, and ABS enters the stage of increasing the torque. If the wheel is in the optimal braking state, ABS enters the stage of holding the torque. If the wheel approaches to the locking state, the coil winding 13 is applied with an appropriate low-level current, then ABS coming into the stage of reducing the torque. At the end of braking, the reverse current is applied to the motor 101, meanwhile the applied current to the coil winding 13 of the magnetostrictive-driving piston mechanism 114 is cut off, and the magnetostrictive-driving piston mechanism 114 resets.

Figure 6:
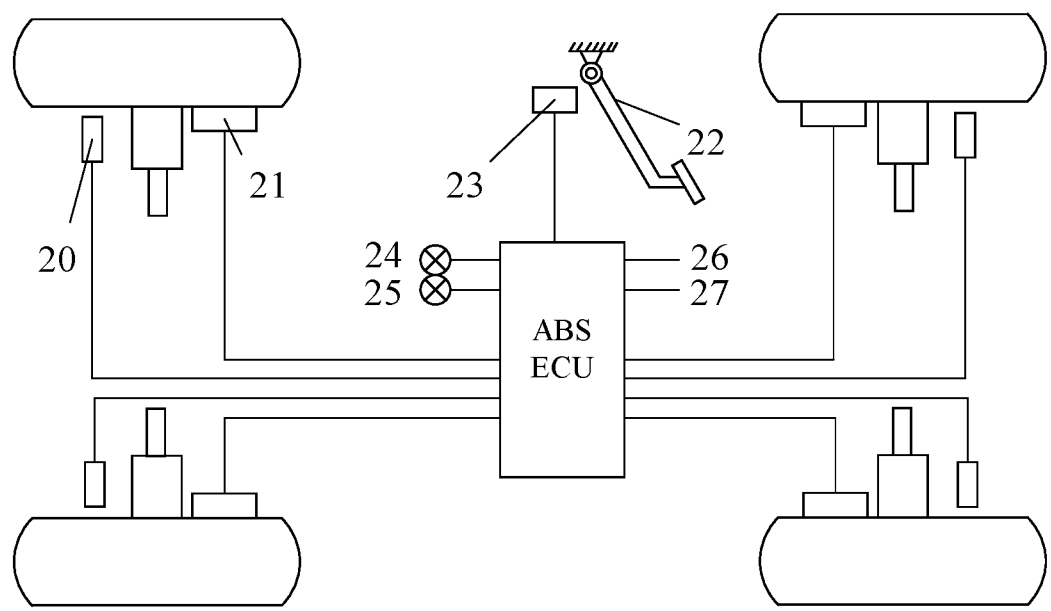
FIG. 6 shows a configuration of the present exemplary embodiment being applied to an automotive ABS.

Referring now to FIG. 6, the diagram of this invention being applied to an automotive ABS is shown. The whole system includes an ABS electronic control unit (ECU), wheel speed sensors 20, by-wire brakes 21, electronic brake pedal 22 and an angle sensor 23. The ECU receives the signal of angle of the electronic brake pedal 22 transmitted by the angle sensor 23 and the signal of the wheel speed from the wheel speed sensor 20, then evaluates the vehicle braking state and appropriately controls the by-wire brakes 21. There are an ABS indicator 24, a parking brake indicator 25, an ignition switch 26 and a battery 27 in FIG. 6. The core of this brake-by-wire system is the signal reception and processing of the ECU and the braking execution of the commands issued by the ECU. The entire system removes braking master cylinder and wheel cylinder in the conventional hydraulic braking systems, sophisticated pipelines and a variety of valve components required by ABS, resulting in a greatly simplified system.

Figure 7:
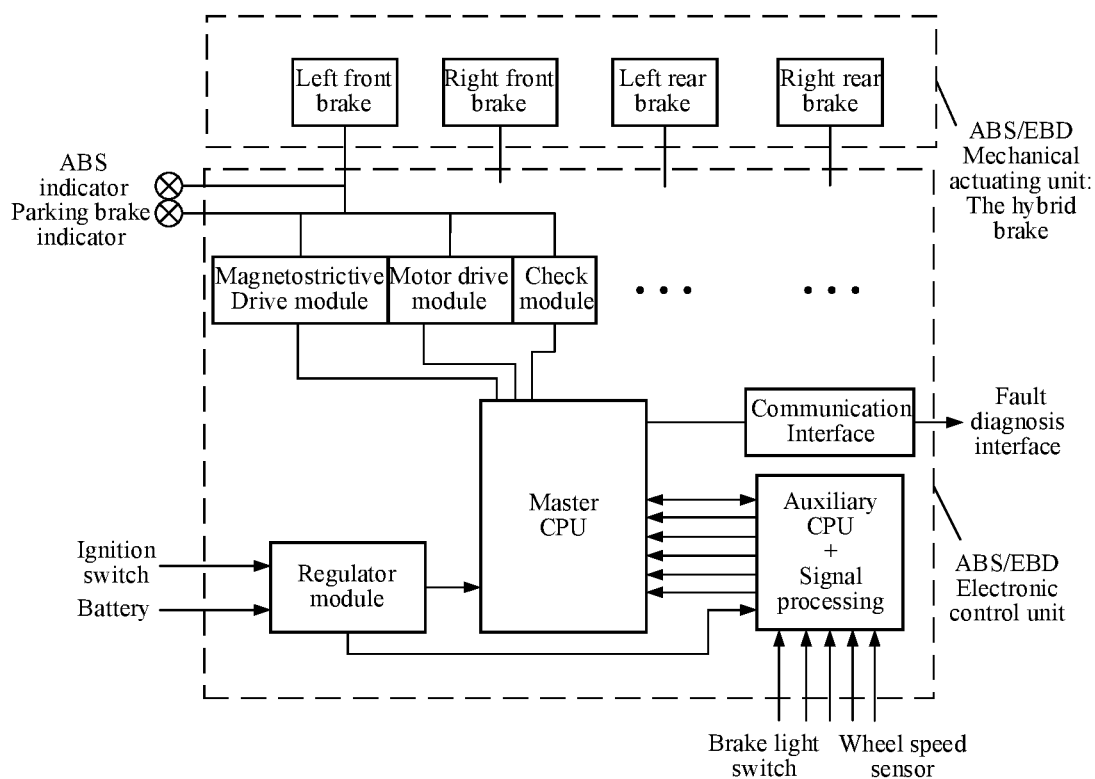
FIG. 7 shows a control diagram for the configuration in FIG. 6.

Referring now to FIG. 7, diagram of the circuit in FIG. 6 is shown. The entire circuit system is mainly composed of a master central processing unit (CPU), an auxiliary CPU, a regulator module circuit, a motor-driving module circuit, a magnetostrictive-driving module circuit, a drive module and signal processing module circuit components of check device and a safety protection circuit. If the transmission mechanism is using a screw set, the check device drive module is not needed. If the transmission mechanism is using clutch, the check device drive module needs to be replaced by the clutch control module. The two CPUs of ABS and ECU receive the same input signal of vehicle states, then the results of the processing of the two microprocessors are compared by communication. If the results of the two microprocessors are not consistent, the microprocessor immediately issues a control command to make ABS quit work to prevent system logic errors. The auxiliary CPU receives the signal and processes the signal. The master CPU receives the signal processed by the auxiliary CPU and issues a corresponding instruction to the corresponding drive module circuit. The main function of the drive circuit is to power the output digital signal of CPU amplification and drive the executing components (the motor and magnetostrictive rod in the invention), to achieve the vehicle braking and the adjustment function of "reducing", "holding" or "increasing" the torques.

Figure 8:
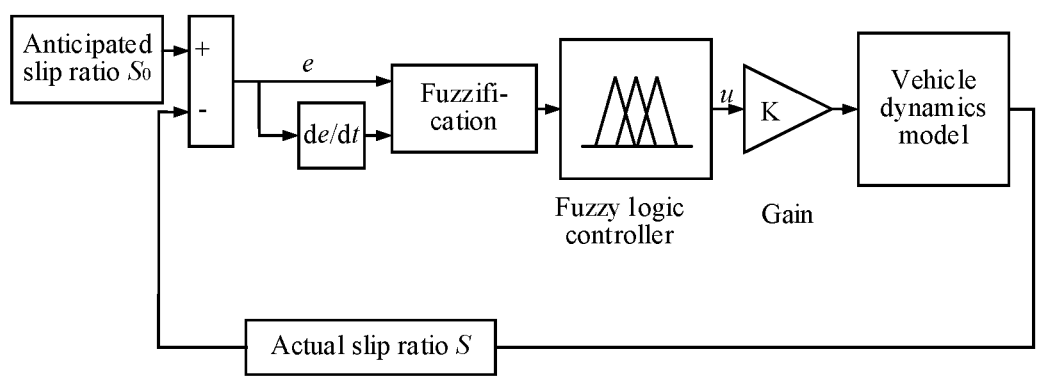
FIG. 8 shows a block diagram of fuzzy control used in ABS in automotive braking systems in accordance with the exemplary embodiment of the present invention.

Referring now to FIG. 8, simulation block diagram of fuzzy control system used in ABS in automotive braking system is shown. The fuzzy control system is a dual-input single-output module based on the slip ratio, so using the slip ratio error e and rate of change de/dt as the inputs. The fuzzy output u is used as the current adjustment value of the magnetostrictive rod coil in the brake, controlling the slip ratio S of the vehicle to approach the optimal slip ratio. Where the slip ratio error e is the difference between the expected slip ratio $S_0$ and the measured slip ratio S, and the rate of change de/dt is the derivative of e.

Figure 9:
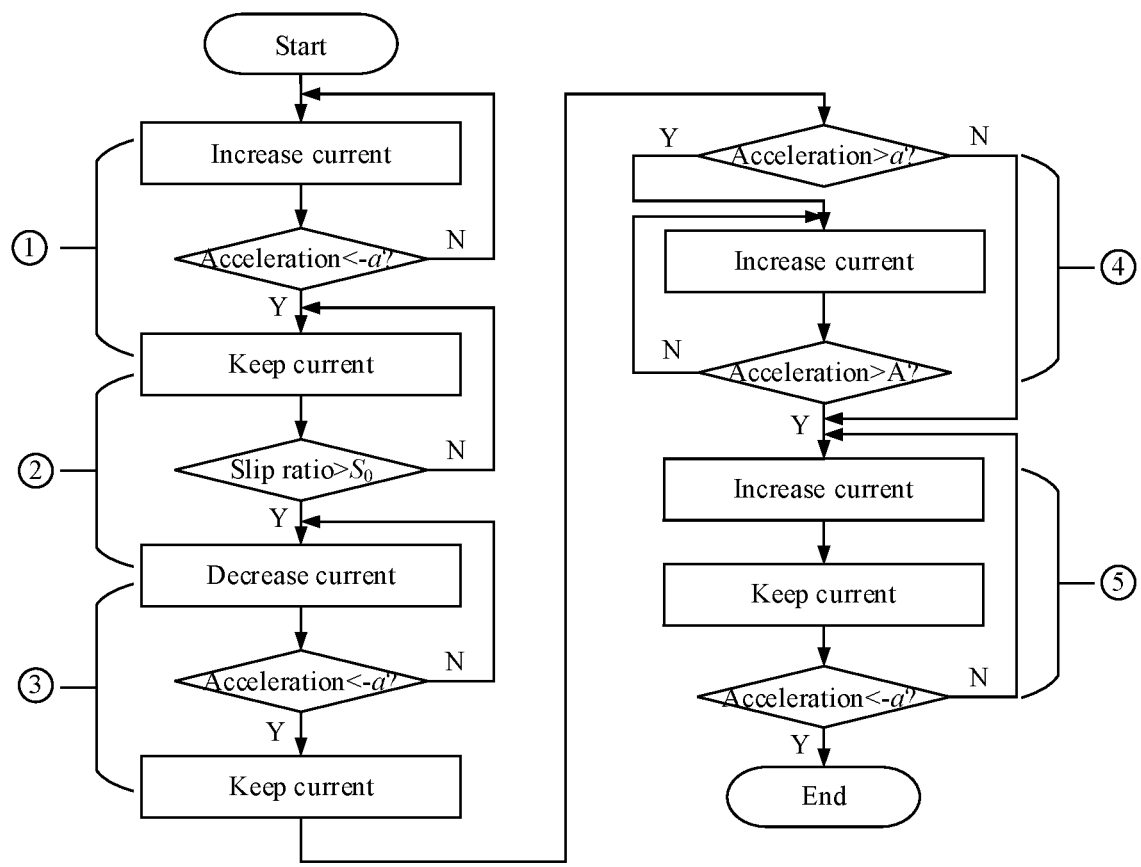
FIG. 9 shows a control flow chart of the logic threshold method of ABS used in the automotive braking system in the exemplary embodiment.

Referring now to FIG. 9, the control flow chart of the logic threshold method of ABS used in the automotive braking system is shown. When braking, the motor 101 and the magnetostrictive-driving piston mechanism 114 work coordinately. The motor 101 pushes the right and left brake pads 119, 121 to overcome the brake clearance and the corresponding resistance as soon as possible. When the braking torque reaches the preset value, the applied current to the motor 101 is cut off, and the magnetostrictive-driving piston mechanism 114 is controlled to realize the ABS function by adjusting the applied current in the coil winding 13. No initial current is applied to the coil winding 13 of the magnetostrictive-driving piston mechanism 114. As shown in FIG. 9, at the start stage of ABS braking, the applied current in the coil winding 13 increases, resulting in increasing braking torque. At the end of the stage ①, the wheel acceleration reaches the preset threshold –a, the applied current remains unchanged so that the wheels are fully braked. When control process enters the stage ②, there is no need to reduce the applied current at this time until the slip ratio is greater than the reference slip ratio threshold $S_0$. Reducing the applied current, the control process enters the stage ③. Since the applied current reduces, the braking torque reduces and the wheel is accelerated by the inertia. The wheel deceleration starts to rise, and when the wheel acceleration is higher than the threshold value –a, the applied current remains unchanged and the control process enters the stage ④. During this, the applied remains unchanged and the wheel continues to accelerate due to the inertia until the acceleration exceeds the threshold a. At the end of stage ④, if the wheel acceleration exceeds the preset upper bound acceleration threshold A (A>a), the applied current increases until the acceleration is below the threshold A and then the applied current remains unchanged. If the wheel acceleration is below the threshold a, it indicates that the wheel is in the stable zone of the adhesion coefficient slip ratio curve at the end of stage ④. Thus, in the stage ⑤, the applied is continuously switched by increasing or holding until the wheel acceleration is again lower than the threshold value –a. All above is for a complete cycle of ABS when using the BBW in present invention, then it is time for entering the next cycle of ABS.

Figure 10:
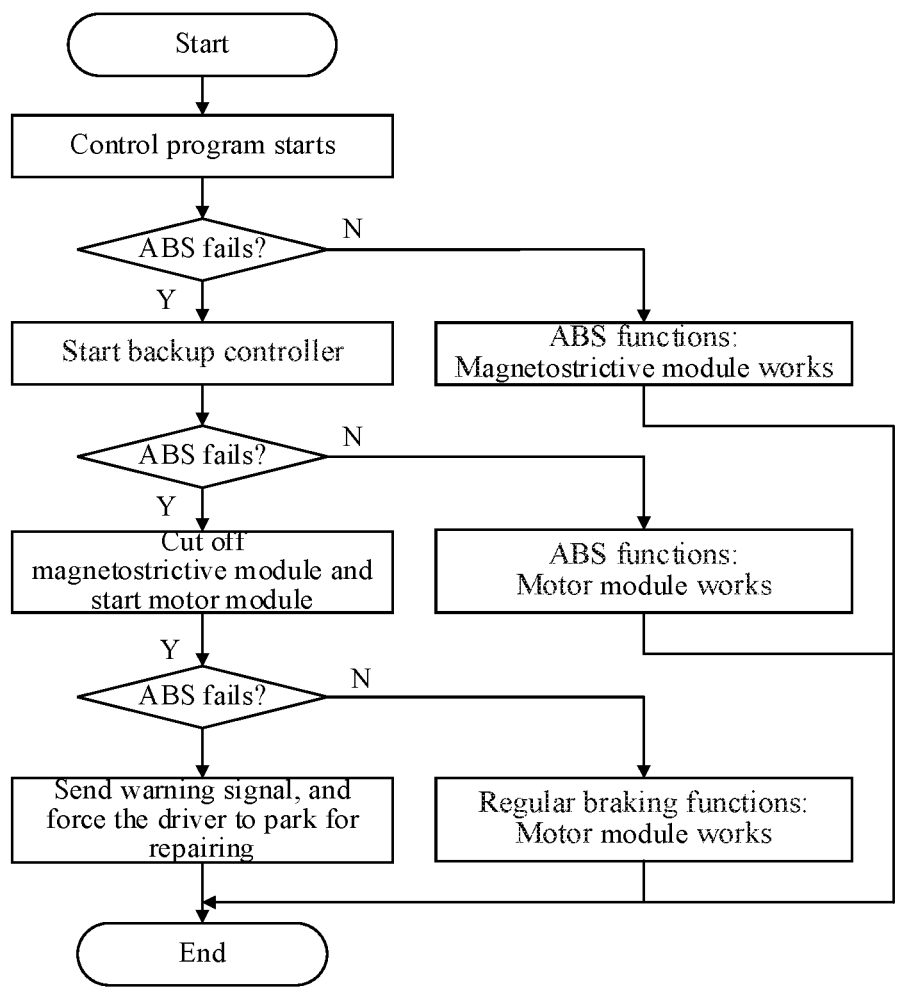
FIG. 10 shows a flow chart of fail-safe solution for braking failure used in the automotive braking system in the exemplary embodiment.

Referring now to FIG. 10, the control flow chart of braking function of ABS (and/or long-time braking) of the braking system and the system failure in the present invention applied to the automotive braking system is shown. Taking the control failure of the system as an example as shown in FIG. 10. The magnetostrictive-driving module for braking with ABS performance, motor-driving module for braking with ABS performance and motor-driving regular braking with no ABS performance will be potentially functioning with descending priority with consideration of the fail-safe behavior. If the magnetostrictive-driving piston/wedge mechanism fails to work (i.e., If the brake system demands to start ABS, the system starts the initial inspection and the ABS control process. If the failure of the ABS control system is detected), the main control system starts the backup controller to continue commanding ABS. If fails again, the main control system cuts off the magnetostrictive-driving module and its control signal, meanwhile, starts the only motor-driving module, and simultaneously sends the warning signal to the driver. The main system attempts to realize the ABS function using the motor-driving module. If fails, the driver is forced to park for repairing.

What is claimed is:

1. A hybrid BBW system using a motor-magnetostrictive actuator combination, comprising:
   a motor, a transmission mechanism, a magnetostrictive-driving piston mechanism and a floating-caliper disc mechanism,
   wherein the transmission mechanism including a planetary gear set and a screw set is driven by the motor;
   the linear motion of a sleeve is achieved by the transmission of the planetary gear set and a screw set;
   a piston head of the magnetostrictive-driving piston mechanism pushed forward by both the sleeve and the magnetostrictive rod drives the brake pad back plate to squeeze the brake disc through the right and left brake pads of the floating-caliper disc mechanism, which accomplishes braking and
   the output end of a pushrod is screwed into the piston head of the magnetostrictive-driving piston mechanism;
   a gland is connected with the front end of the piston body by threads;
   the pushrod is compressed onto the front end of the magnetostrictive rod by a bias spring;
   the rear end of the piston body connected with the front end of the sleeve is driven by the sleeve to move linearly; and
   a coil winding is wound on the bobbin installed outside of the magnetostrictive rod, which realizes axial extension or contraction for the magnetostrictive rod under the electromagnetic field generated by the coil winding with applied current.

2. The hybrid BBW system using a motor-magnetostrictive actuator combination as claimed in claim 1, wherein
   the motor includes a stator and a rotor;
   the ring gear of the planetary gear set fixedly connected with the rotor is driven by the motor;
   the screw of the screw set is coaxially assembled with the carrier and the sun gear of the planetary gear set;
   the screw is assembled on the planet carrier via a connecting key on one end;
   the nut and the screw are connected via threads; and
   the sleeve which cases the nut fixedly connected with the nut at its rear end through bolts is driven to move linearly.

3. The hybrid BBW system using a motor-magnetostrictive actuator combination as claimed in claim 1, wherein
   the left brake pad is fixed to inner side of the left caliper arm of a caliper body;
   the right brake pad is fixed to the left side of the brake pad back plate;
   the brake disc is sandwiched between the right and left brake pads;
   the right side of the brake pad back plate is connected to the front end of the piston head in a "T" shape; and
   the brake pad back plate driven by the piston head pushes the right brake pad to squeeze the brake disc, forcing the caliper body to push the left brake pad towards the right to squeeze the brake disc, which realizes braking.

4. The hybrid BBW system using a motor-magnetostrictive actuator combination as claimed in claim 3 further comprising a guide rail penetrating the brake pad back plate in the caliper body from which the brake pad back plate gets guided.

5. The hybrid BBW system using a motor-magnetostrictive actuator combination as claimed in claim 1 further comprising a prestress bolt installed onto the rear end of the magnetostrictive rod for adjusting the initial position of the magnetostrictive rod.

6. The hybrid BBW system using a motor-magnetostrictive actuator combination as claimed in claim 1, wherein the control process includes the steps of:
  (a) no initial current is applied to the coil winding of the magnetostrictive-driving piston mechanism;
  (b) when braking, the motor and the magnetostrictive-driving piston mechanism cooperate to push the right brake pad to overcome the brake clearance and the corresponding resistance and
  compress the brake disc to be clamped by the right and the left brake pad;
  (c) when the braking torque reaches the preset value, the applied current to the motor is cut off; and the screw set enters self-locking state;
  (d) if the braking torque is insufficient, correspondingly, the coil winding of the magnetostrictive-driving piston mechanism is applied with an appropriate high-level current, ABS enters the stage of increasing the torque;
  (e) if the wheel is in the optimal braking state, ABS enters the stage of holding the torque;
  (f) if the wheel tends to lock, correspondingly, the coil winding of the magnetostrictive-driving piston mechanism is applied with an appropriate low-level current, then ABS enters the stage of reducing the torque; (f) at the end of braking, reverse current is applied to the motor, simultaneously, the applied current in the coil winding of the magnetostrictive-driving piston mechanism is cut off; and the magnetostrictive-driving piston mechanism resets.

7. The hybrid BBW system using a motor-magnetostrictive actuator combination as in claim 1, wherein
  a ball-screw set is used to replace the screw set; and
  a check structure consisting of a ratchet and a pawl is assembled onto the ball-screw set.

\* \* \* \* \*